United States Patent
Persson (10) Patent No.: US 10,239,221 B2
(45) Date of Patent: Mar. 26, 2019

(54) CUTTING DEVICE

(71) Applicant: Markisol Holding AB, Ronneby (SE)

(72) Inventor: Bo Persson, Bräkne-Hoby (SE)

(73) Assignee: MARKISOL HOLDING AB (SE)

( * ) Notice: Subject to any disclaimer, the term of this patent is extended or adjusted under 35 U.S.C. 154(b) by 0 days.

(21) Appl. No.: 15/506,653

(22) PCT Filed: Aug. 26, 2014

(86) PCT No.: PCT/SE2014/050970
§ 371 (c)(1),
(2) Date: Feb. 24, 2017

(87) PCT Pub. No.: WO2016/032373
PCT Pub. Date: Mar. 3, 2016

(65) Prior Publication Data
US 2017/0274548 A1  Sep. 28, 2017

(51) Int. Cl.
*B26D 3/16* (2006.01)
*E06B 9/42* (2006.01)
(Continued)

(52) U.S. Cl.
CPC .............. *B26D 3/16* (2013.01); *B26D 3/166* (2013.01); *B26D 5/08* (2013.01); *E06B 9/40* (2013.01);
(Continued)

(58) Field of Classification Search
CPC .......... B26D 3/16; B26D 3/166; B26D 1/025; B26D 1/02; B26D 17/00; B26D 7/28; B23B 2260/088
See application file for complete search history.

(56) References Cited

U.S. PATENT DOCUMENTS

| 219,470 A | * | 9/1879 | Hayden | ................. B65H 75/18 33/733 |
| 2,326,293 A | | 8/1943 | Gast | |

(Continued)

FOREIGN PATENT DOCUMENTS

| DE | 29501197 U1 * | 3/1995 | ............. B26D 3/164 |
| EP | 1 355 033 B1 | 10/2003 | |
| GB | 2 455 820 B | 6/2009 | |

OTHER PUBLICATIONS

English translation of DE 29501197 U1, Mar. 1995 (Year: 1995).*

*Primary Examiner* — Alan Snyder
(74) *Attorney, Agent, or Firm* — Condo Roccia Koptiw LLP (57) ABSTRACT

The invention concerns a cutting device (1) for reducing the width of a ready-made roller blind blank (28) comprising a roller tube onto which a fabric has been wound. The cutting device (1) comprises a mandrel (13), which is adapted to be inserted into and hold an end to be cut of the roller tube, and a knife arrangement, which is adapted to circumferentially cut first the fabric wound on the roller tube and then the roller tube on the mandrel (13) such that the width of the ready-made roller blind blank (28) is reduced. The invention also concerns a ready-made roller blind blank (28), which comprises a roller tube, onto which a fabric has been wound and which is adapted to be cut by means of a cutting device (1) according to the invention. For this the roller blind blank (28) comprises a disposable wrapping, which bears a visible measurement scale along at least one end portion of the roller blind blank (28).

19 Claims, 8 Drawing Sheets

(51) Int. Cl.
    *B26D 5/08*         (2006.01)
    *E06B 9/40*         (2006.01)
    *B23D 17/00*      (2006.01)
    *B26D 3/00*        (2006.01)
    *E06B 9/00*        (2006.01)
    *B26D 1/02*        (2006.01)

(52) U.S. Cl.
    CPC ................ *E06B 9/42* (2013.01); *B23D 17/00* (2013.01); *B26D 1/025* (2013.01); *B26D 3/00* (2013.01); *E06B 9/00* (2013.01)

(56) References Cited

U.S. PATENT DOCUMENTS

| | | |
|---|---|---|
| 3,299,754 A | 1/1967 | Steingass et al. |
| 4,589,313 A | 5/1986 | Meyers et al. |
| 6,742,423 B1 | 6/2004 | Huang |
| 2005/0150337 A1 | 7/2005 | Cheng |

\* cited by examiner

CUTTING DEVICE

CROSS REFERENCE TO RELATED APPLICATIONS

This application is the National Stage Entry under 35 U.S.C. § 371 of Patent Cooperation Treaty Application No. PCT/SE2014/050970, filed 26 Aug. 2014 the contents of which are hereby incorporated by reference herein.

TECHNICAL FIELD

The present invention concerns a cutting device to be used for reducing the width of a ready-made roller blind blank as well as a ready-made roller blind blank to be cut by means of the cutting device.

In this context, by ready-made roller blind blank is meant a blank comprising a roller tube onto which a fabric has been wound. This blank is then to be completed into a ready-to-use roller blind at least by brackets, which are to be used to attach a roller blind to a building structure, hubs, which are to be inserted into opposite ends of the roller tube, and a bottom bar, which is to be attached to a lower edge of the fabric, wherein said hubs serve to rotate the roller tube on the brackets in order to roll the fabric up and down.

PRIOR ART

In the art it is known to produce roller blinds in many different ways, for example as revealed in the prior art documents EP 1 355 033 B1 and GB 2 455 820 B. Further, it is known to produce them in only a few module based widths, such as widths of 600, 800, 1000, 1200 and 1400 mm, that is in modules of 200 mm in this example.

Obviously these module based widths cannot fit all applications. Hence, in order to adapt a roller blind to a given place it is known to choose an oversized roller blind, which then is cut to a fitting size. For this first the fabric of a roller blind blank according to the definition above is unwound. Then the width of the fabric is reduced by cutting by means of scissors or a knife and the cut off fabric portion removed. Now the remaining fabric is again wound onto the roller tube, whereupon the length of the roller tube is reduced by means of a saw to fit the narrower fabric.

OBJECT OF THE INVENTION

It is obvious that adapting a roller blind in the way described above for one thing requires some skills, especially when it comes to performing a straight cut by means of scissors or a knife. Further it is obvious too that the known adaptation procedure is time consuming and therefore expensive if performed by a professional. In the light of this it is an object of the present invention to provide a cutting device, which makes it possible to provide perfect cutting results within a fraction of the time required before for cutting roller blind blanks. A further object of the invention is to provide a roller blind blank, which is especially well suited for use in the cutting device according to the invention.

BRIEF SUMMARY OF THE INVENTION

According to the invention the first object of the invention is achieved by means of a cutting device for reducing the width of a ready-made roller blind blank, which comprises a roller tube onto which a fabric has been wound, said cutting device comprising a mandrel, which is adapted to be inserted into and hold an end to be cut of the roller tube, and a knife arrangement, which is adapted to circumferentially cut first the fabric wound on the roller tube and then the roller tube on the mandrel such that the width of the ready-made roller blind blank is reduced. The basic idea behind the invention is, contrary to prior art, to cut the fabric while wound on the roller tube. In that way an easy to perform circumferential cut through all layers of the wound-up fabric swiftly leads to an evenly reduced width of the fabric at hand. And further, by making use of the fact that the roller tube is already mounted in a known position on the mandrel, use of the knife arrangement to cut the roller tube as well does also reduce time and ensure quality.

Preferably the mandrel of the cutting device is rotatable such that circumferential cutting can be performed by means of a stationary knife arrangement. By this is meant a knife arrangement which not itself has to rotate around the mandrel in order to perform circumferential cutting. This simplifies the whole layout of the cutting device and renders removal of the cut-off fabric portion easier as it can be rolled off.

Preferably a dog is arranged opposite to the mandrel, said dog being displaceable along and lockable onto a guide way extending in parallel with the mandrel in order to secure an opposite end of the roller tube. The dog helps stabilizing the roller tube, and together with the guide way it makes the cutting device resemble a lathe.

Preferably the knife arrangement from an initial cutting position is displaceable in parallel with the mandrel along a slide block, which in its turn is displaceable along and lockable onto a guide way extending in parallel with the mandrel. Again, this is a layout resembling a lathe, which is a well-tried and well functioning machine solution.

Preferably the knife arrangement comprises a first knife, which is adapted to cut the fabric, and a second knife, which is adapted to cut the roller tube. By using two different knives, each knife can be especially adapted to the material it has to cut, wherein, preferably, the second knife is a rotatable circular knife.

Preferably the second knife is offset in relation to the first knife such that the cut roller tube protrudes slightly from the cut fabric provided that the knife arrangement is kept in the same position as when cutting the fabric by means of the first knife. By choosing a certain offset it is rendered possible to easily attain and maintain an even quality level.

Preferably the knives are arranged on opposite sides of the mandrel and are manually actuatable by means of one lever each. By placing the knives on opposite sides of the mandrel they do not interfere which each other although they are set to perform cuts just millimeters apart. And making them manually actuatable by means of levers, provides for an optimum and swift control by an operator.

Preferably the mandrel is rotatable by means of a reversible drive motor. By using a reversible drive motor it is rendered possible to choose an optimum rotation direction depending on the direction of the fabric wound on the roller tube both when cutting the fabric, which is done best along the winding direction of the fabric, and when unwinding the cut off portion of the fabric, which has to be done against the winding direction of the fabric.

According to the invention the second object of the invention is achieved by means of a ready-made roller blind blank comprising a roller tube, onto which a fabric has been wound and which is adapted to be cut by means of a cutting device according to the invention, said roller blind blank further comprising a disposable wrapping, which bears a visible measurement scale along at least one end portion of the roller blind blank. The measurement scale is advantageous because it simplifies determination of the placement of a cut to be made. For a unicoloured fabric it suffices to arrange such a measurement scale at just one end portion of the roller blind blank, because in that case just one end has to be cut. The measurement scale comprises for example a millimeter based index starting from zero at the end to be cut and counting upwards towards the opposite end of the roller blind blank. In case of a patterned fabric out of symmetry reasons often both ends of a roller blind blank have to be cut. Therefore the measurement scale sometimes has to be provided at both end portions of a roller blind blank, preferably counting from zero and upwards starting from each end.

BRIEF SUMMARY OF THE DRAWINGS

Preferred embodiments of the invention are shown in the appended drawings, on which.

DETAILED DESCRIPTION OF PREFERRED EMBODIMENTS

In the following preferred embodiments of the invention are described in detail with reference being had to the appended schematic drawings, in which like reference numbers indicate like features.

Figure 1:
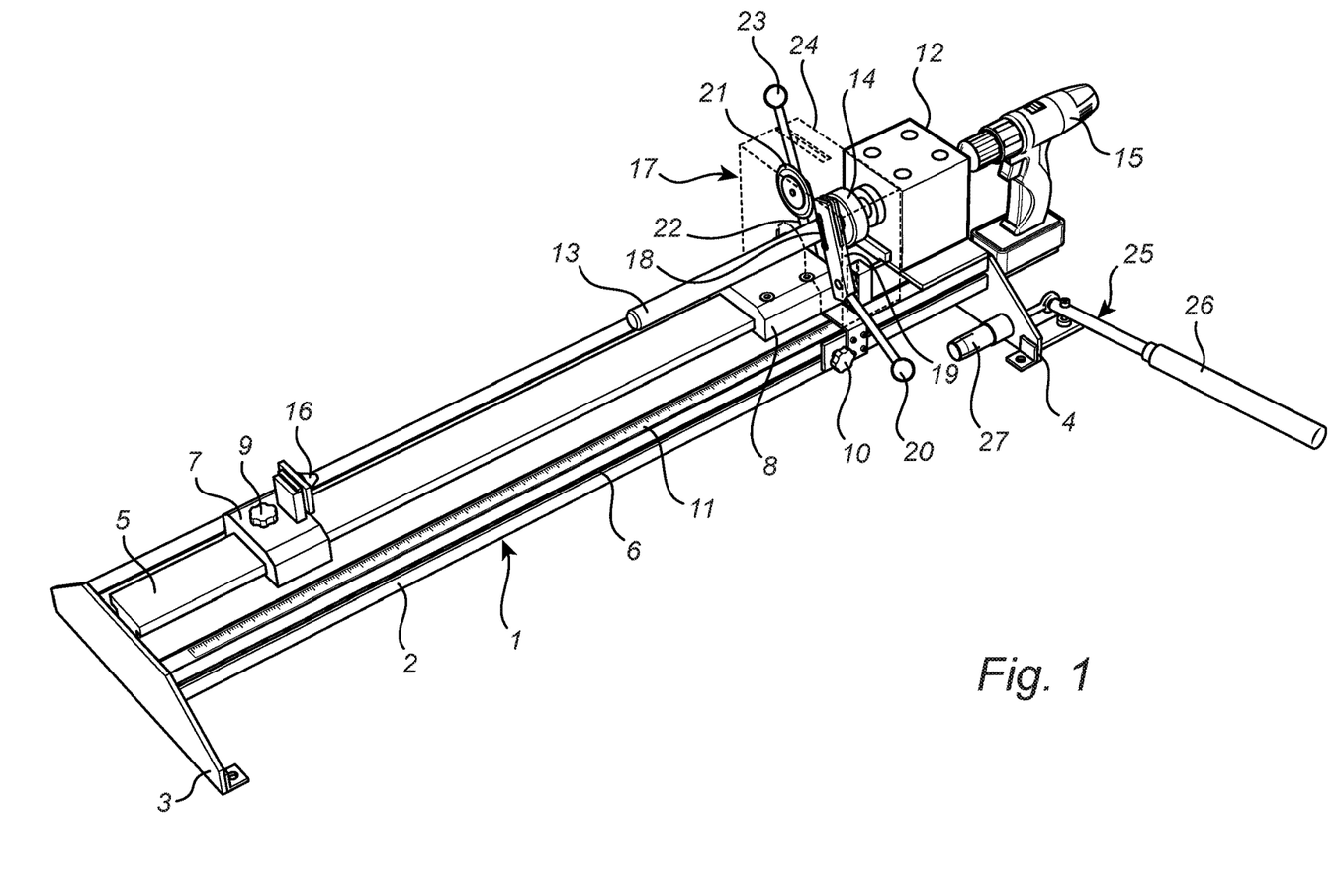
FIG. 1 shows a cutting device according to the invention in a perspective view.

FIG. 1 shows a cutting device 1 according to a preferred embodiment of the invention. The cutting device 1 comprises a horizontal, elongate guide way 2, which rests on vertical end plates 3, 4. Seen in cross section, the guide way 2 has a T-shaped top, which forms a rail 5 along the guide way 2, and vertical sides, along which an undercut slot 6 extends. The rail 5 is used to guide a first slider 7 and a second slider 8, of which the first slider 7 is displaceable along the rail 5 and lockable thereto by means of a knob means 9 and of which the second slider 8 is displaceable along the rail 5 but lockable to the slot 6 by means of a knob means 10 in a position indicated by means of a measurement scale 11 of the guide way 2.

Adjacent to the second end plate 4 a hub assembly 12 is attached to the top of the guide way 2. The hub assembly 12 serves to journal a mandrel 13, which extends horizontally above the center of the rail 5 for some length, such as a quarter of the total length of the guide way 2, which for example can be about 1.8 m long. The mandrel 13 is circular cylindrical and has a diameter which is to fit the interior diameter of a roller tube described later on. Close to the hub assembly 12 it bears a puck shaped plastic disk 14, which by means of a central bore is slidingly seated on the mandrel 13 and in an initial position abuts a shoulder of the mandrel 13, said shoulder being placed between the disk 14 and the hub assembly 12. The mandrel 13 is rotatable around its longitudinal axis in both directions by means of a drive motor 15, in the case at hand illustrated by means of a cordless electric screw driver arranged on an opposite side of the hub assembly 12 as the disk 14.

The first slider 7 comprises a rotatable dog 16, which is arranged opposite to and exactly facing the mandrel 13. The dog 16 is conical and has a maximum diameter which fits the interior diameter of the roller tube described later on.

The second slider 8 comprises a knife arrangement, generally depicted 17. The knife arrangement 17 comprises a first knife 18, which facing the mandrel 13 is mounted on a swivel arm 19 and consists of a razor-like blade suitable for cutting a textile fabric. The swivel arm 19 can swivel around a horizontal shaft, which is in parallel with the mandrel 13 and arranged on one side of it, and is manually operatable by means of a lever 20. The knife arrangement 17 further comprises a second knife 21, which also facing the mandrel 13 is mounted on a swivel arm 22.

The second knife 21 consists of a circular, rotatable blade, which is suitable for cutting a roller tube made of aluminum or plastics. The swivel arm 22 can swivel around a horizontal shaft, which too is in parallel with the mandrel 13 but is arranged on an opposite side thereof as the other horizontal shaft mentioned before. Again the swivel arm 22 is manually operatable by means of a lever, this time enumerated 23.

By arranging both knives 18, 21 on opposite sides of the mandrel 13 neither they nor their swivel arms 19, 22 or levers 20, 23 do hinder each other although they are arranged almost at the same distance from the hub assembly 12. To be more precise, the second knife 21 is preferably arranged about 5 mm closer to the hub assembly 12, and the reason for that will be explained below.

In FIG. 1 broken lines are used to illustrate a housing 24, which suitably is made of a transparent material, such as acrylic plastic, and for safety reasons shields parts of the knife arrangement 17. Together with the knife arrangement 17, the housing 24 is displaceable on the second slider 8 away from and towards the hub assembly 12. Thus a part of the mandrel 13 close to the hub assembly 12 can be exposed between the hub assembly 12 and the housing 24 even if the second slider 8 is slid as close as possible towards the hub assembly 12.

Finally, close to the hub assembly 12 the second end plate 4 of the cutting device 1 of FIG. 1 holds an expander unit, generally depicted 25. The expander unit 25 comprises an operating handle 26, which actuates a tapering expanding head 27, the use of which will be described below.

Figure 2:
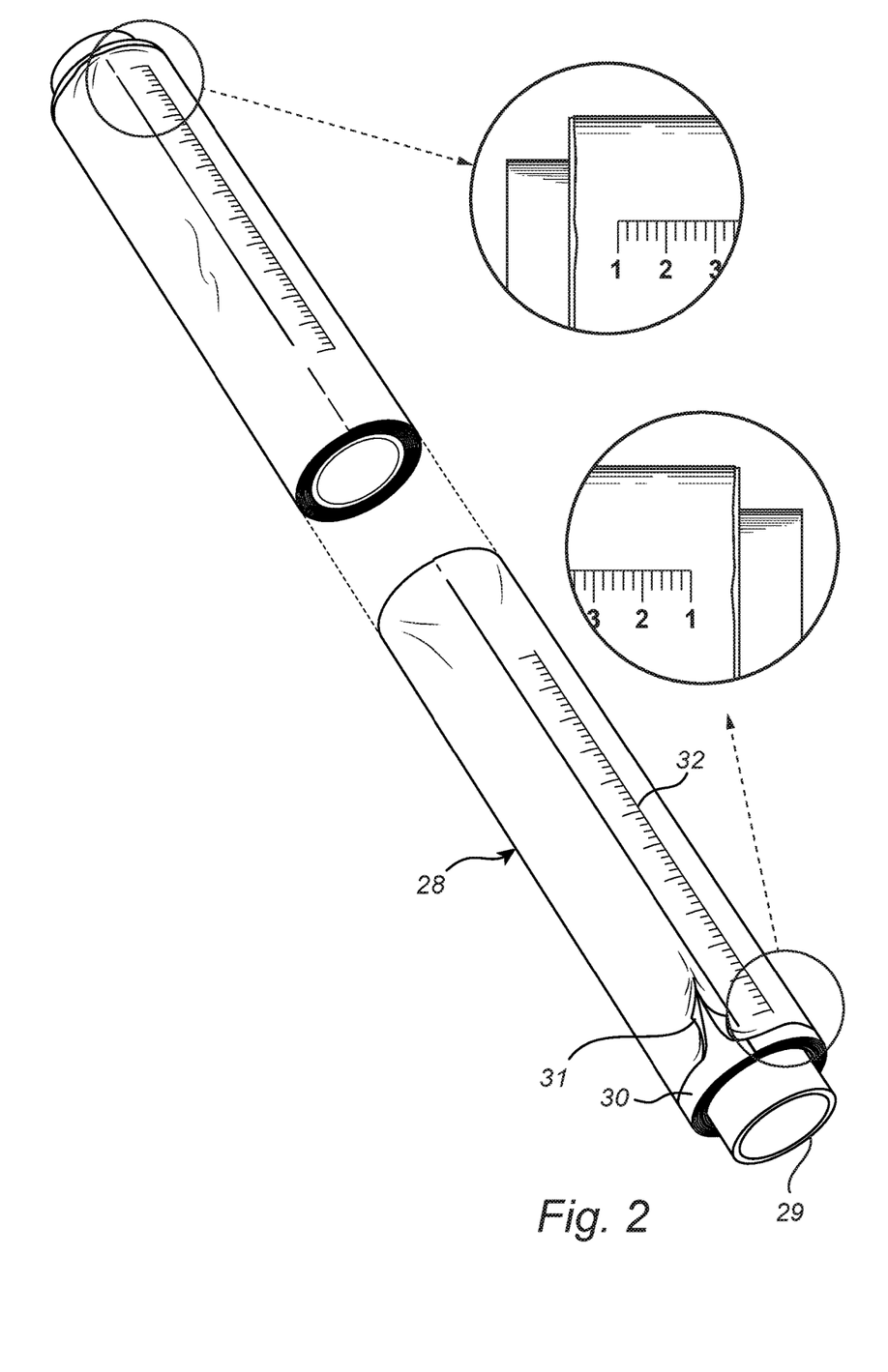
FIG. 2 shows a roller blind blank according to the invention in a perspective view.

In FIG. 2 a roller blind blank 28 according to a preferred embodiment of the invention is shown. The roller blind blank 28 forms a ready-made unit according to the introduction, which means that it comprises a roller tube 29 onto which a fabric 30 has been wound. According to the preferred embodiment the roller tube 29 is made of aluminum, which today is one of the most common choices for this. The roller tube 29 has a length fitting a module based scheme for a manufacturer's roller blinds, such as 600-1400 mm in module steps of 200 mm.

The fabric 30 wound on the roller tube 29 is usually a textile one, although other kinds of fabrics, such as plastic cloths or foils, are used from time to time. In any case the fabric 30 has a width slightly less than the length of the roller tube 29. In total the dimensional difference between the two usually is about 10 mm, which means about 5 mm at each end as the fabric is centered on the roller tube 29.

The roller blind blank 28 further comprises a disposable wrapping 31, which surrounds the fabric 30 wound on the roller tube 29 and holds it in place and protects it during transport and so on. This is well known in the art, but the roller blind blank 28 according to the invention differs from that by having its wrapping 31 bear a visible measurement scale 32 along at least one end portion of the roller blind blank 28. As can be seen in the enlarged portions of FIG. 2 each measurement scale 32 starts at an end of a roller blind blank 28 and increases in steps towards a mid portion thereof.

Having described both the cutting device 1 and the roller blind blank 28 with reference to FIGS. 1 and 2, now the description turns to FIGS. 3a-3g, in which the way is described in which the cutting device 1 and the roller blind blank 28 cooperate in a most advantageous way.

First (FIG. 3a) in order to be cut a roller blind blank 28 is pushed (c.f. arrow A) onto the mandrel 13 of the cutting device 1 until it comes to abut the puck-shaped disk 14, which is arranged as close as possible to the hub assembly 12. Then (FIG. 3b) the roller blind blank 28 is secured by moving the first slider 7 towards (c.f. arrow B) the mandrel until the conical dog 16 becomes inserted into and abuts the end of the roller blind blank 28. Now the knob 9 is tightened to complete the securing action.

In the next step (FIG. 3c) the knife arrangement 17, pushed to its position on the second slider 8 as close as possible to the hub assembly 12, is by means of the second slider 8 displaced (c.f. arrow C) along the guide way 2 to a desired cutting position. The cutting position can easily be determined either by means of the measurement scale 11 of the guide way 2 or a measurement scale 32 on the roller blind blank 28. When in position the second slider is locked to the guide way 2 by tightening the knob 10.

Next (FIG. 3d) the drive motor 15 is activated to rotate (c.f. arrow D) the mandrel and hence the roller blind blank 28 preferably such that it runs in a winding and not an unwinding direction with respect to the fabric of the roller blind blank 28. Now by means of the lever 20 the first knife 18 is manually moved (c.f. arrows E and F) towards the fabric of the rotating roller blind blank 28, where it is allowed to circumferentially cut deep into the fabric until it reaches the underlying roller tube of the roller blind blank 28, thus cutting a portion of the fabric completely off.

In the following step (FIG. 3e) first the drive motor 15 is stopped and the knife arrangement 17 moved (c.f. arrow G) along the stationary second slider 8 to a position as distant as possible from the hub assembly 12. Then the wrapping of the cut off fabric portion 30' of the roller blind blank 28 is removed, thus freeing an outer end of that portion 30'. Now the drive motor 15 is activated to unwind (c.f. arrow H) the cut off fabric portion 30' until it finally can be torn off the roller tube 29, where the fabric usually is glued on.

Next (FIG. 3f) the knife arrangement 17 is again pushed (c.f. arrow I) to its initial position on the second slider 8, which means that the first knife 18 returns exactly to the position where the fabric cutting took place. Now the drive motor 15 is again activated to rotate the roller blind blank 28, this time in an arbitrary direction (c.f. the exemplifying arrow J) since no more fabric has to be cut. Instead by manual operation (c.f. arrow K) of the lever 23 the rotary second knife 21 comes into play and is pressed against a rotating freed roller tube portion 29' of the roller blind blank 28 at a position dictated by a certain offset (c.f. gap L) of the second knife 21 in relation to the first knife 18, which in the foregoing was described such that the second knife 21 preferably is arranged about 5 mm closer to the hub assembly 12 than the first knife 18. The offset leads to cutting of the freed roller tube portion 29' by means of the second knife 21 along a perfectly circumferential line about 5 mm away from the remaining fabric of the roller blind blank 28.

Figure 3A:
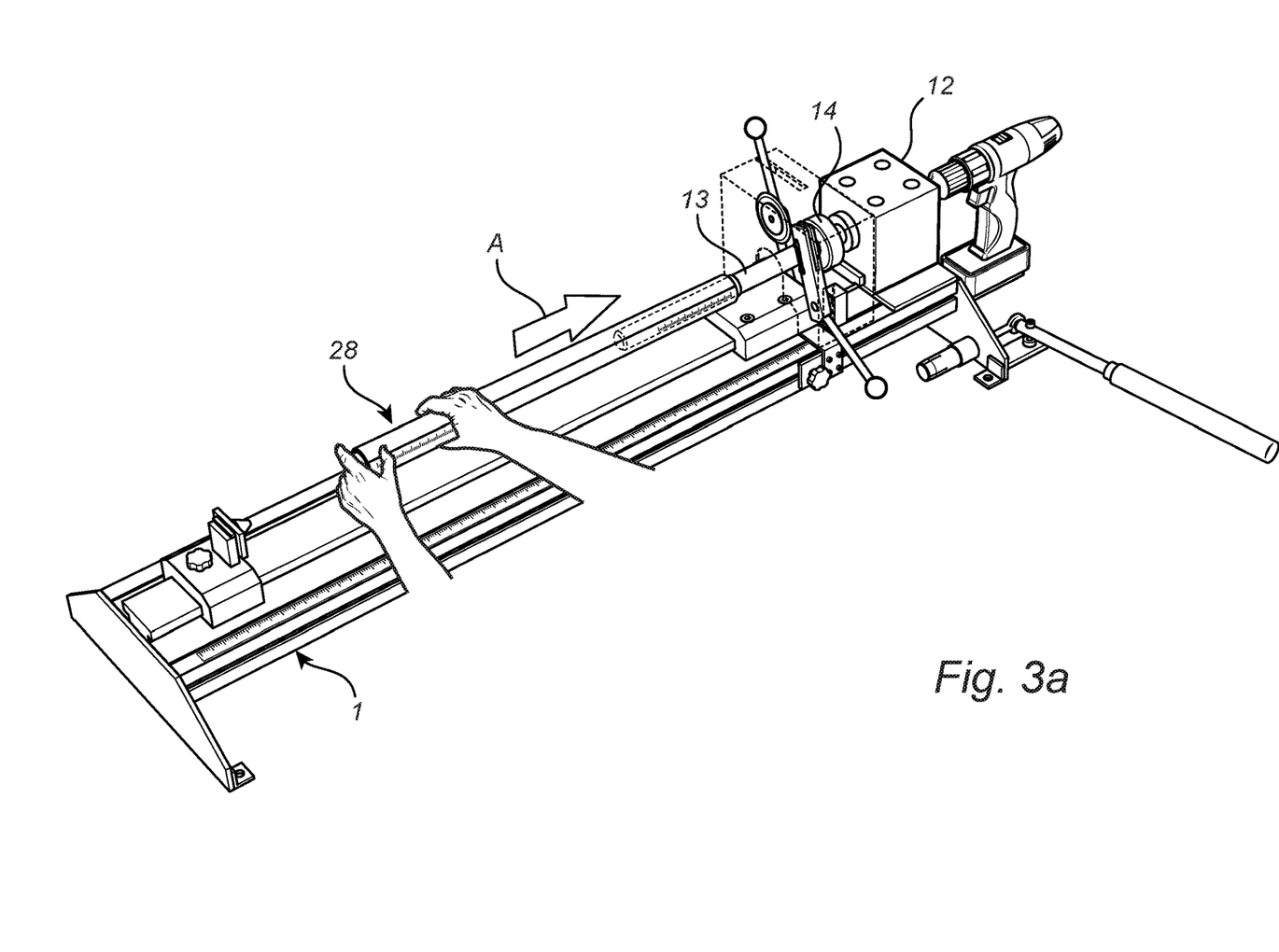
FIGS. 3a-3g illustrate different steps while reducing the width of a roller blind blank by means of the cutting device according to the invention.
Figure 3B:
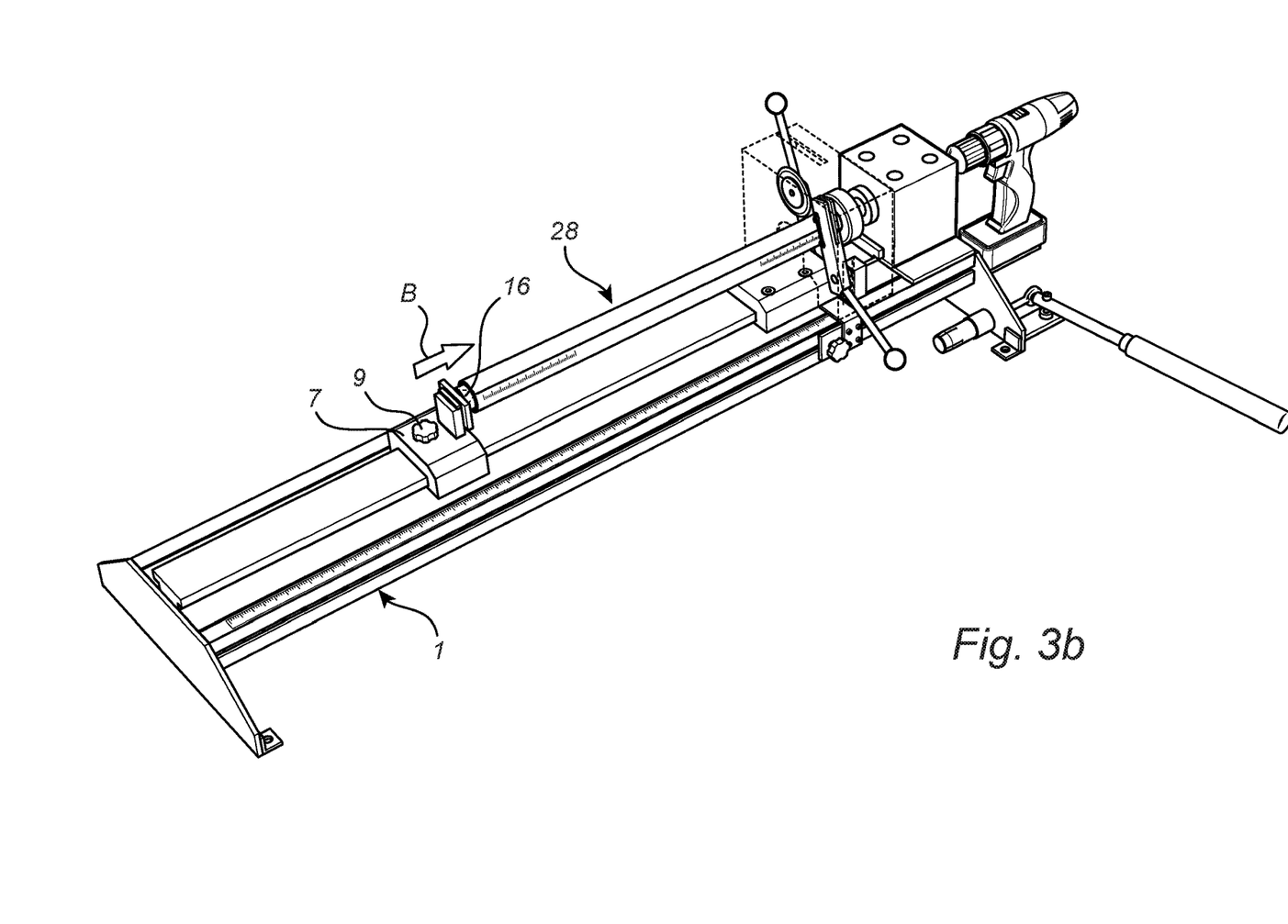
Figure 3C:
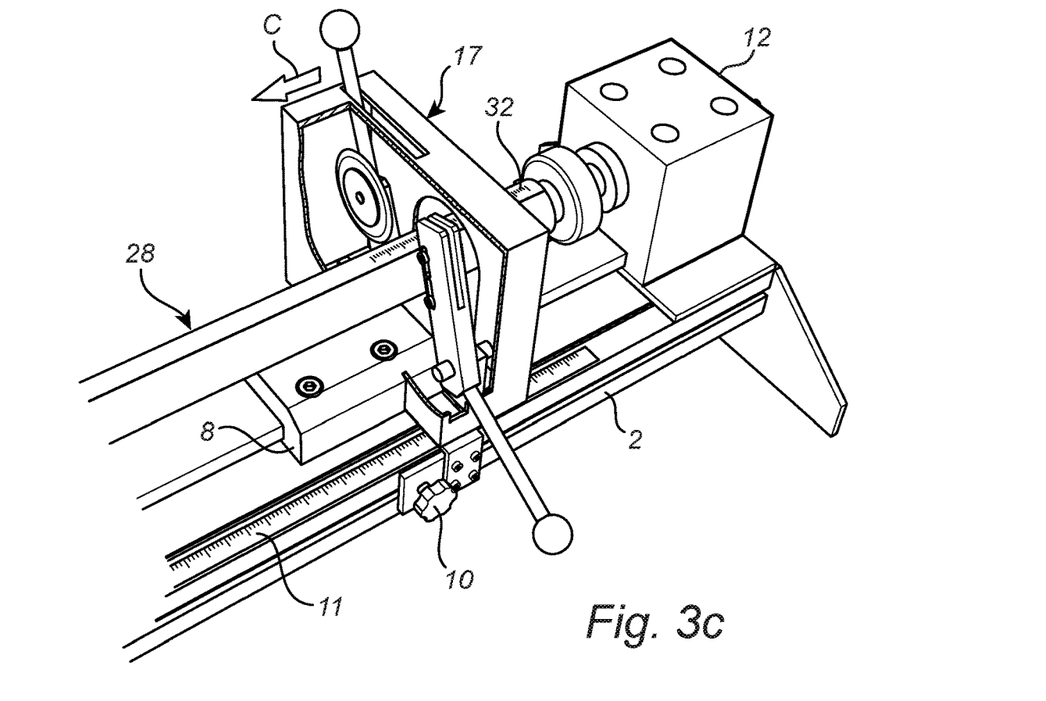
Figure 3D:
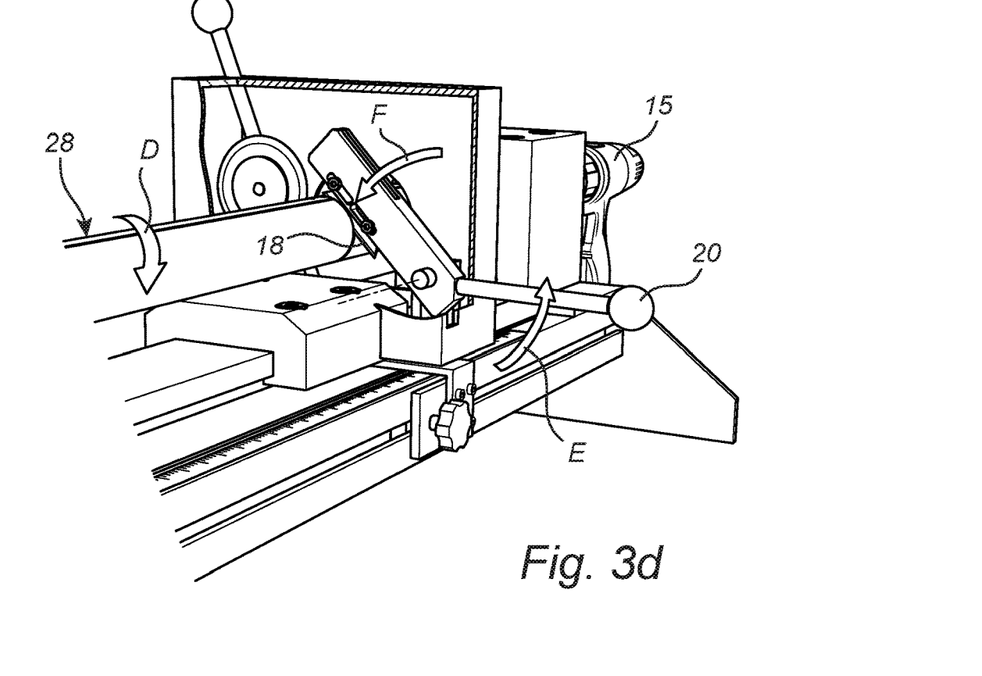
Figure 3E:
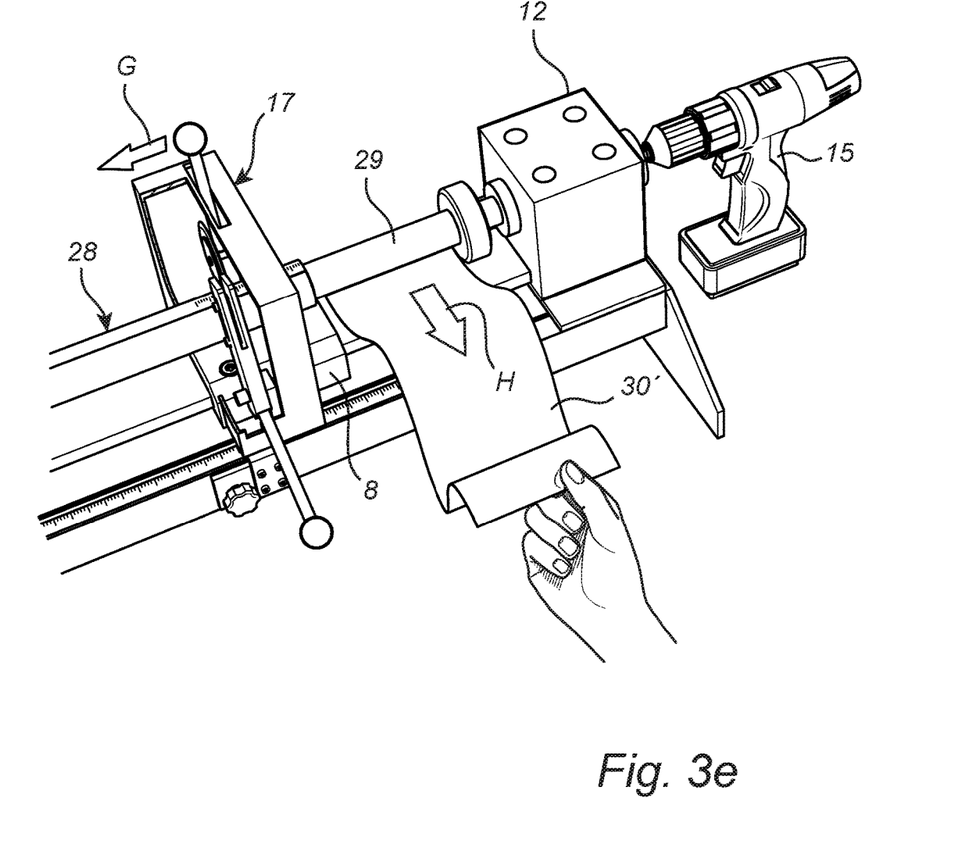
Figure 3F:
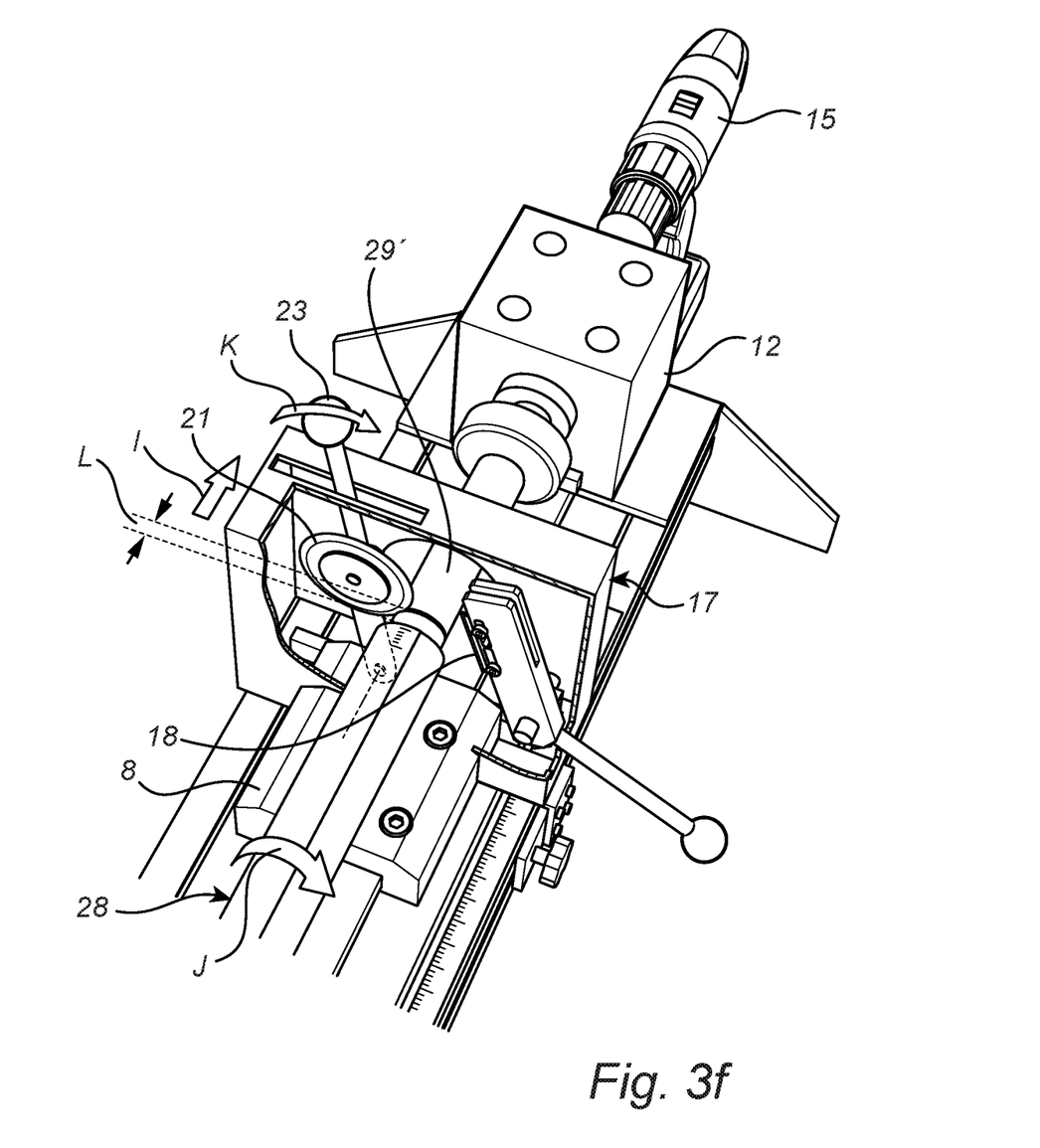
Figure 3G:
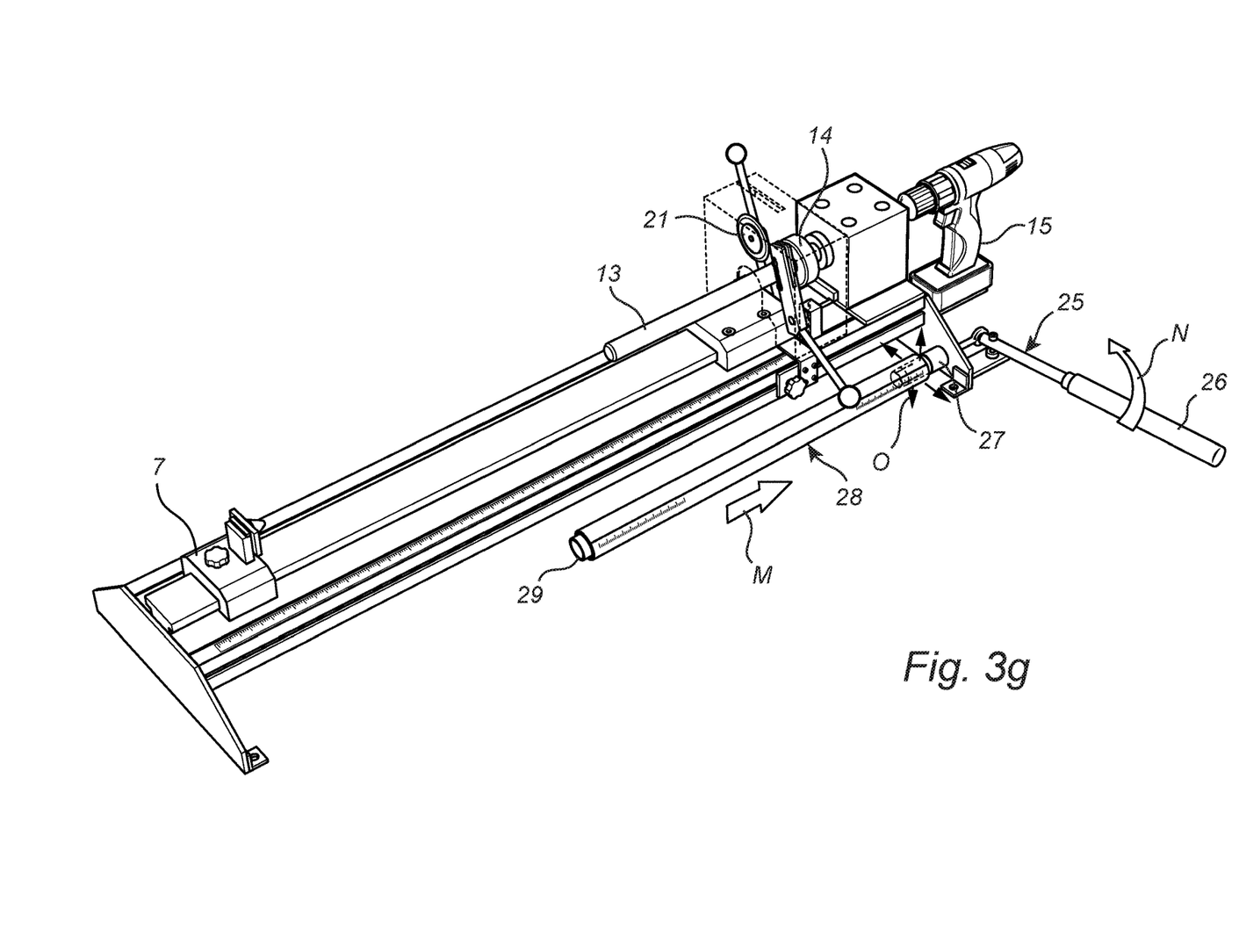

Now (FIG. g) the drive motor 15 is stopped again, the first slide 7 is moved away and the cut roller blind blank 28 is drawn off the mandrel 13. In order to remove the cut off freed roller tube portion it is possible to use the slidingly seated disk 14 to simply push it off the mandrel 13 instead of trying to pull it off, which can be difficult especially if the cut off portion is short and hard to grip. In a final step the expander unit 25 is used to widen the cut end of the roller tube 29, since cutting by means of the rotary second knife 21 tends to slightly reduce the tube orifice. The widening operation is performed simply by pushing (c.f. arrow M) the roller tube 29 onto the expanding head 27 and by using (c.f. arrow N) the operating handle 25 to make the expanding head 27 expand circumferentially (c.f. arrows O).

Especially the cutting device according to the preferred embodiment described above can be varied in many different ways within the scope of the appended claims. Thus, for example the mandrel does not need to be rotatable if instead the knife arrangement is enabled to encircle the roller blind blank. Further, there is no absolute need of a dog securing the roller blind blank if the mandrel used is sufficiently long and holds the roller blind blank with a sufficiently tight fit. And finally, just to give another example, the knife arrangement does not necessary need to comprise two knives, provided that a single knife used is able to cut both the fabric and the roller tube in an acceptable way, which may well be the case especially if the roller tube is made of plastics instead of aluminum.

The invention claimed is:

1. A cutting device comprising:
   a mandrel configured to be inserted into and hold an end of a roller tube comprised in a roller blind blank, a fabric being wound on said roller tube; and
   a knife arrangement configured to circumferentially cut first the fabric wound on the roller tube and then cut the roller tube on the mandrel at a location supported by the mandrel such that a width of the roller blind blank is reduced.

2. The cutting device according to claim 1, wherein the mandrel is rotatable such that circumferential cutting can be performed using the knife arrangement while the knife arrangement remains stationary.

3. The cutting device according to claim 1, wherein a dog is arranged opposite to the mandrel, said dog being displaceable along a guideway, wherein the dog is configured to be lockable onto a guide way that extends in parallel with the mandrel in order to secure an opposite end of the roller tube.

4. The cutting device according to claim 1, wherein the knife arrangement is configured to be displaceable from an initial cutting position such that it is displaceable in parallel with the mandrel along a slide block, wherein the slide block is displaceable along a guide way extending in parallel with the mandrel and the slide block is configured to be lockable onto the guide way.

5. The cutting device according to claim 1, wherein the knife arrangement comprises a first knife and a second knife, the first knife being adapted to cut the fabric and the second knife being adapted to cut the roller tube.

6. The cutting device according to claim 5, wherein the second knife is a rotatable circular knife.

7. The cutting device according to claim 5, wherein the second knife is offset in relation to the first knife such that the cut roller tube protrudes slightly from the cut fabric provided that the knife arrangement is kept in the same position as when the fabric is cut using the first knife.

8. The cutting device according to claim 5, wherein the first and second knives are arranged on opposite sides of the mandrel, the first knife being configured to be activated using a first lever and the second knife being configured to be activated using a second lever.

9. The cutting device according to claim 2, wherein a reversible drive motor is configured to rotate the mandrel.

10. A roller blind blank comprising:
a disposable wrapping, the disposable wrapping bearing a visible measurement scale along at least one end portion of the roller blind blank;
a roller tube, a fabric being wound around the roller tube, wherein the roller tube is adapted to be cut by a cutting device, said cutting device comprising:
a mandrel configured to be inserted into and hold an end of the roller tube comprised in the roller blind blank, a fabric being wound on said roller tube, and
a knife arrangement configured to circumferentially cut first the fabric wound on the roller tube and then cut the roller tube on the mandrel at a location supported by the mandrel such that a width of the roller blind blank is reduced.

11. The roller blind blank according to claim 10, wherein the mandrel is rotatable such that circumferential cutting can be performed using the knife arrangement while the knife arrangement remains stationary.

12. The roller blind blank according to claim 10, wherein a dog is arranged opposite to the mandrel, said dog being displaceable along a guideway, wherein the dog is configured to be lockable onto a guide way that extends in parallel with the mandrel in order to secure an opposite end of the roller tube.

13. The roller blind blank according to claim 10, wherein the knife arrangement is configured to be displaceable from an initial cutting position such that it is displaceable in parallel with the mandrel along a slide block, wherein the slide block is displaceable along a guide way extending in parallel with the mandrel and the slide block is configured to be lockable onto the guide way.

14. The roller blind blank according to claim 10, wherein the knife arrangement comprises a first knife, and a second knife, the first knife being adapted to cut the fabric and the second knife being adapted to cut the roller tube.

15. The roller blind blank according to claim 14, wherein the second knife is a rotatable circular knife.

16. The roller blind blank according to claim 14, wherein the second knife is offset in relation to the first knife such that the cut roller tube protrudes slightly from the cut fabric provided that the knife arrangement is kept in the same position as when the fabric is cut using the first knife.

17. The roller blind blank according to claim 14, wherein the first and second knives are arranged on opposite sides of the mandrel, the first knife being configured to be activated using a first lever and the second knife being configured to be activated using a second lever.

18. The roller blind blank according to claim 11, wherein a reversible drive motor is configured to rotate the mandrel.

19. A method for reducing a width of a roller blind blank, the method comprising
inserting a mandrel into an end of a roller tube, the roller tube being comprised in the roller blind blank, a fabric being wound on said roller tube;
circumferentially cutting the fabric wound on the roller tube using a knife arrangement; and
circumferentially cutting the roller tube on the mandrel at a location supported by the mandrel such that the width of the roller blind blank is reduced.

* * * * *